United States Patent [19]
Petrovic

[11] Patent Number: 5,456,556
[45] Date of Patent: Oct. 10, 1995

[54] DEVICE FOR TRANSFER OF ARTICLES BY AIR-FLOW

[76] Inventor: Zmaj Petrovic, 5, rue des Fleurs, 67450 Lampertheim, France

[21] Appl. No.: 84,193

[22] PCT Filed: Nov. 9, 1992

[86] PCT No.: PCT/FR92/01042

§ 371 Date: Sep. 2, 1993

§ 102(e) Date: Sep. 2, 1993

[87] PCT Pub. No.: WO93/09046

PCT Pub. Date: May 13, 1993

[30] Foreign Application Priority Data

Nov. 8, 1991 [FR] France .................................. 91 14052

[51] Int. Cl.⁶ ................................................. B65G 51/03
[52] U.S. Cl. .................................................. 406/88; 226/97
[58] Field of Search ........................... 406/86, 88; 226/7, 226/97

[56] References Cited

U.S. PATENT DOCUMENTS 3,395,943  8/1968  Wilde et al. ............................. 406/88
5,222,840  6/1993  Ingraham et al. ........................ 406/88
5,320,457  6/1994  VanderMeer et al. .................... 406/88

Primary Examiner—Andrew C. Pike
Attorney, Agent, or Firm—Lerner, David, Littenberg, Krumholz & Mentlik

[57] ABSTRACT

A device air-flow transfers objects each having at least one substantially flat surface. The device consists of a plurality of modules. Each module includes a chamber receiving a tray assembly. The tray assembly has at least a bottom part. The chamber is formed with a least first and second compartments separated by a wall having an opening. At least two orifices are provided penetrating through the bottom part into the second compartment. At least two channels are formed penetrating through the bottom part to the first compartment. Each opening has a stopping member with at least one passage going therethrough. A fan having a blade is housed in the chamber, so that the blade faces the opening in the wall.

14 Claims, 4 Drawing Sheets

DEVICE FOR TRANSFER OF ARTICLES BY AIR-FLOW

BACKGROUND OF THE INVENTION

The subject of this invention is a device for transfer of articles by air-flow.

Devices using a directed air-flow to move from one place to another articles (i.e., boxes) having a flat surface used for applying the air-flow are known from the prior art.

These devices are primarily consist of metal chambers. In upper walls of such chambers there are provided regularly distributed oblique-axis orifices or shutters. All such orifices are oriented in the same direction. A fan external to the chambers typically provides air through sheaths. The air escapes through the shutters creating a directed flow that serves both to support and move articles. Vertically oriented orifices in the upper walls of the chambers serve solely for supporting purposes can be joined with the oblique orifices to move articles having bottom portions which are not perfectly flat.

However, the existing devices have known disadvantages. Specifically, as to the regularity of the air flow in the chambers which keep the air flow substantially constant, this necessitates distribution of several air intake vents over the entire length of the chamber. Moreover, these devices are expensive; this is because they are custom-made based on the transfer needs of specific customers.

Lastly, these devices are usable only in one direction of movement according to their design. If it is necessary, as is the case of certain manufacturing operations, such devices are able to transfer products successively in two opposite directions. In such devices, however, it is necessary to use conveyor-belt transfer machines having the disadvantages inherent therein. Specifically, such disadvantages relate to reliability and maintenance. This is because changing the direction of movement generally can be accomplished only through lengthy and complicated adjustments.

SUMMARY OF THE INVENTION

The present invention aims to remedy the above-discussed disadvantages of the known devices by proposing a transfer device with a modular air cushion having greater efficiency than that of the prior art and a considerably lower manufacturing cost. The invention offers the possibility of changing direction easily and also possibilities to be used in locations where the air cushion devices previously could not be used.

The transfer device of the present invention comprises an assembly of several modules identical in their design. In their dimensions or shape, such modules can have rectangular or curved configuration.

Each module of the device according to the invention is characterized essentially in that it has a chamber closed at each of its ends. A tray with shape and dimensions varies depending on the nature of the objects to be moved is assembled on the chamber. The tray and the upper face of the chamber are pierced with orifices which are regularly distributed over their length and width. The orifices are blocked with removable stoppers preferably made of plastic, with at least one piercing having an axis oblique or perpendicular to the plane of the tray.

The tray is anchored to the chamber by appropriate means and has a bottom and two longitudinal edges or guides with spacing variable according to the objects to be transferred.

Pursuant to the invention, each chamber has an internal wall separating an internal volume thereof into at least two compartments. One of such compartments having smaller dimensions has orifices pierced in its upper wall opposite the orifices pierced in one of the longitudinal edges of the tray. The orifices in the bottom of the tray are open into the large compartment.

Furthermore, the chamber houses a fan with a blade situated in the large compartment, opposite an opening in the internal wall. The fan provides suction of the air from the small compartment, through orifices in the edge of the tray. The air is compressed in the large compartment and escapes through the stopper orifices creating an air flow directed toward the surface of the bottom of the tray.

Due to the small diameters of the stopper piercings, and the space defined by the chamber, superpressure is created in the chamber. Therefore, the speed of escape of air through said piercings is much higher than that of currently existing devices. This makes it possible to transport objects having larger weight/carrying surface ratio.

Optionally, it is possible to use a cover made of transparent plastic positioned on the edges of the tray, externally to the orifices. Such orifices may have the air flow circulate by closed circuit. This is appropriate when the device according to the invention is used in so-called "clean room" manufacturing locations, where there must be no dust circulation. This possibility constitutes another appreciable advantage of the device of the invention with respect to existing devices creating constant motion of air.

The modular chambers of the device of the invention can be comprised of profiles of aluminum or hard plastic made by extrusion and closed at both ends thereof.

Since it is relatively expensive to make the chambers of aluminum by extrusion because it necessitates using a high-power press, among other things, the modular chambers of the device of the invention can advantageously be made by assembly of aluminum plates employing extrusion-made profiles.

The profiles used for this purpose can have an overall parallelepiped shape and longitudinal grooves can be provided within at least two sides thereof into which the longitudinal edges of the plates are inserted.

To assure a better connection between the plates and profiles, each of the longitudinal grooves can be provided, on one of its lateral sides, with a series of oblique longitudinal scores directed toward the bottom of said groove.

This method of making the chambers of the device according to the invention also makes it possible to equally adapt the width and height of a chamber, by modifying the width of the aluminum plates; while keeping the profiles in the original condition.

Further advantages of the invention are in the fact that in the entire length of the module, the air outlet speed is constant for a given diameter and length of the orifices made in the stoppers.

Moreover, since the stoppers are removable, it is possible to modify the air outlet speed by replacing them with other stoppers having orifices of varying diameters, obliqueness, and/or lengths.

The possibility of convenient replacing of the stoppers makes the device according to the invention virtually wear-proof. This is because the worn stoppers can be easily replaced.

The operation of replacing the stoppers of the device according to the invention can be done advantageously by driving them in to make them fall into the chamber, then by operating the fan after opening the chamber at one of its ends, through which they are expelled.

The modularity of the device according to the invention makes it possible to use each of the modules individually. It is also possible to modify the general configuration of the transfer path, by juxtaposing curved modules and rectilinear modules.

Another advantage of the device according to the invention lies in the fact that it provides two opposite directions of movement. This is so specifically by using specially designed stoppers. Such stoppers include, anchored to its base, a ring made of a magnetic material. This ring is flush with the internal upper wall of the chamber, against which a metal foil having pierced with orifices of the size of the stoppers can be placed. This can be accomplished under the effect under the effect of a longitudinal transfer along said wall. Alternatively opposite stoppers with oblique orifices directed in opposite directions can be provided. The ring made of magnetic material makes it possible to flatten the foil against the opening of the stoppers which is not arranged opposing the orifices of the foil.

BRIEF DESCRIPTION OF THE DRAWINGS

The advantages and the characteristics of the present invention will be more clearly understood from the following description, which refers to the attached drawing.

In the attached drawing.

DESCRIPTION OF THE PREFERRED EMBODIMENTS

Figure 1:
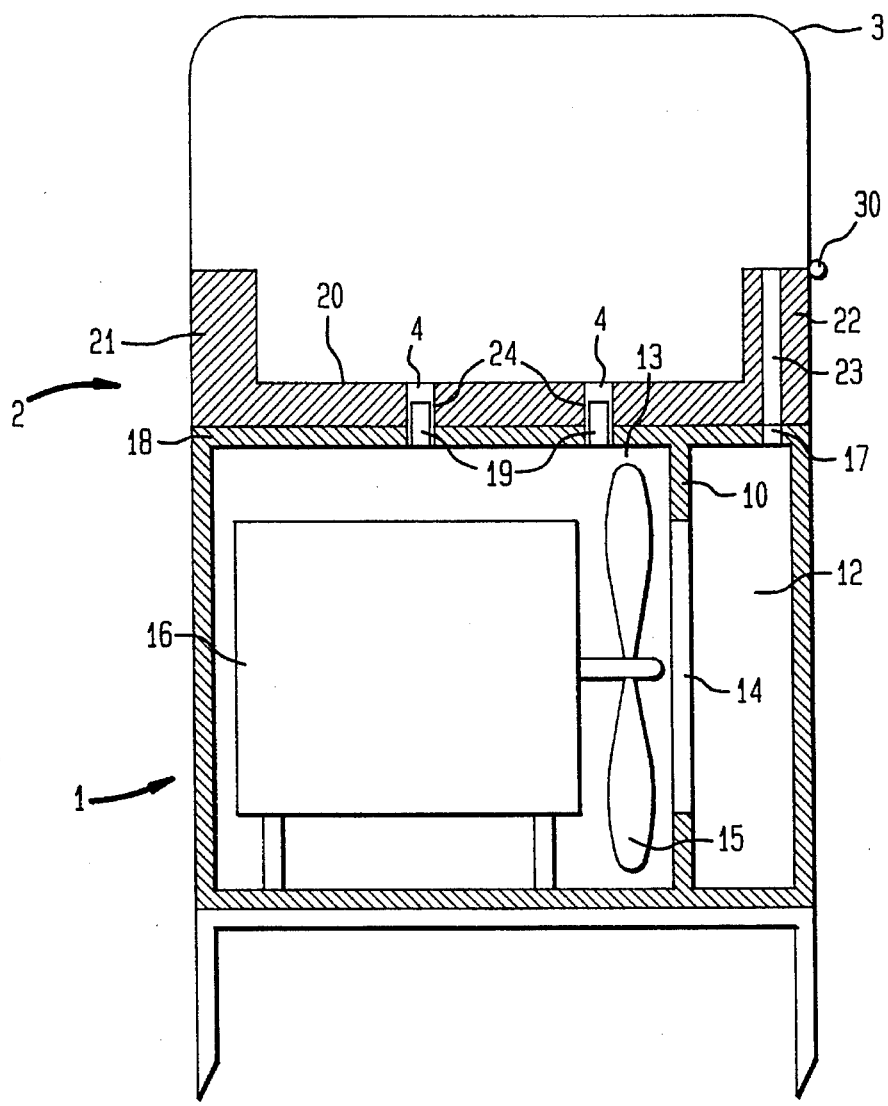
FIG. 1 shows a schematic transverse cross-sectional view of a first method of constructing a transfer module according to the invention.

We refer now to FIG. 1 where there is shown the chamber 1 of a transfer module of the invention having the internal volume divided into two compartments 12 and 13 by a longitudinal vertical wall 10. This wall 10 has a round opening 14.

Blade 15 of a fan 16 is positioned in the main compartment 13 opposite to the opening 14. Advantageously, the diameter of the opening 14 is less than the size of the blade 15. This is necessary in order to induce, in a self-evident manner, an effect of acceleration of the air-flow sucked by the blade 15 of the secondary compartment 12 toward the main compartment 13.

A tray 2 is provided. This tray is anchored to the chamber 1 on its upper face and is provided with a bottom 20 and two longitudinal edges 21 and 22. A cover 3 completely covering the tray 2 is provided at the edge 22 around a horizontal axis 30.

The edge 22 of the tray 2 is pierced with orifices 23 which are regularly distributed and arranged opposite orifices 17 pierced in the upper wall 18 of the chamber 1 which opens into the secondary compartment 12. Similarly, the bottom 20 of the tray 2 is pierced with regularly distributed vertical-oriented orifices 24 situated opposite orifices 19 pierced in the wall 18 of the chamber and opening into the main compartment 13.

Figure 2:
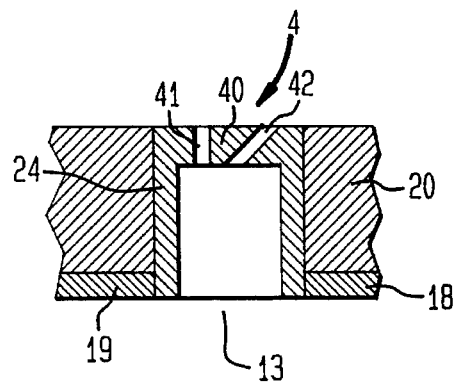
FIG. 2 shows a cross-sectional view, according to a vertical plane, of a stopper.

FIG. 2 shows the stoppers 4 inserted in the orifices 24 and 19. The stoppers 4 contain vertically oriented orifices 41 and oblique orifices 42. Such orifices are located at the upper face 40 and are flush with the upper plane of the bottom 20 of the tray 2.

Thus, under the effect of the fan 16, an air flow is created from the secondary compartment 12. This flow fills the main compartment 13 and escapes through the orifices 41 and 42 of the stoppers 4. The air flow from the vertical orifices 41 supports the objects to be transferred, and the air flow from the oblique orifices 42 enables these objects to move in the direction determined by the piercing of these orifices 42.

When the transfers take place in a "clean room", the air flow circulates in a closed circuit due to the cover 3. The air from the orifices 41 and 42 spreads into the enclosure defined by the cover 3 and is sucked into the secondary compartment 12 through orifices 23 in the edge of the tray 2.

The shape and dimensions of the tray 2 are variable according to their use. For example, it can be wider than the chamber 1, in which case the return-air orifices 23 are oblique or bent to communicate with the orifices 17 of the chamber 1.

By making the stoppers 4 pivot so that the oblique orifices 42 are oriented not in the direction of the movement but obliquely toward the center of the chamber 1, the user can move heavy objects without having to increase the air flow. This is accomplished by increasing the air outlet speed, i.e., by using stoppers with oblique orifices 42 of smaller diameter.

Figure 3:
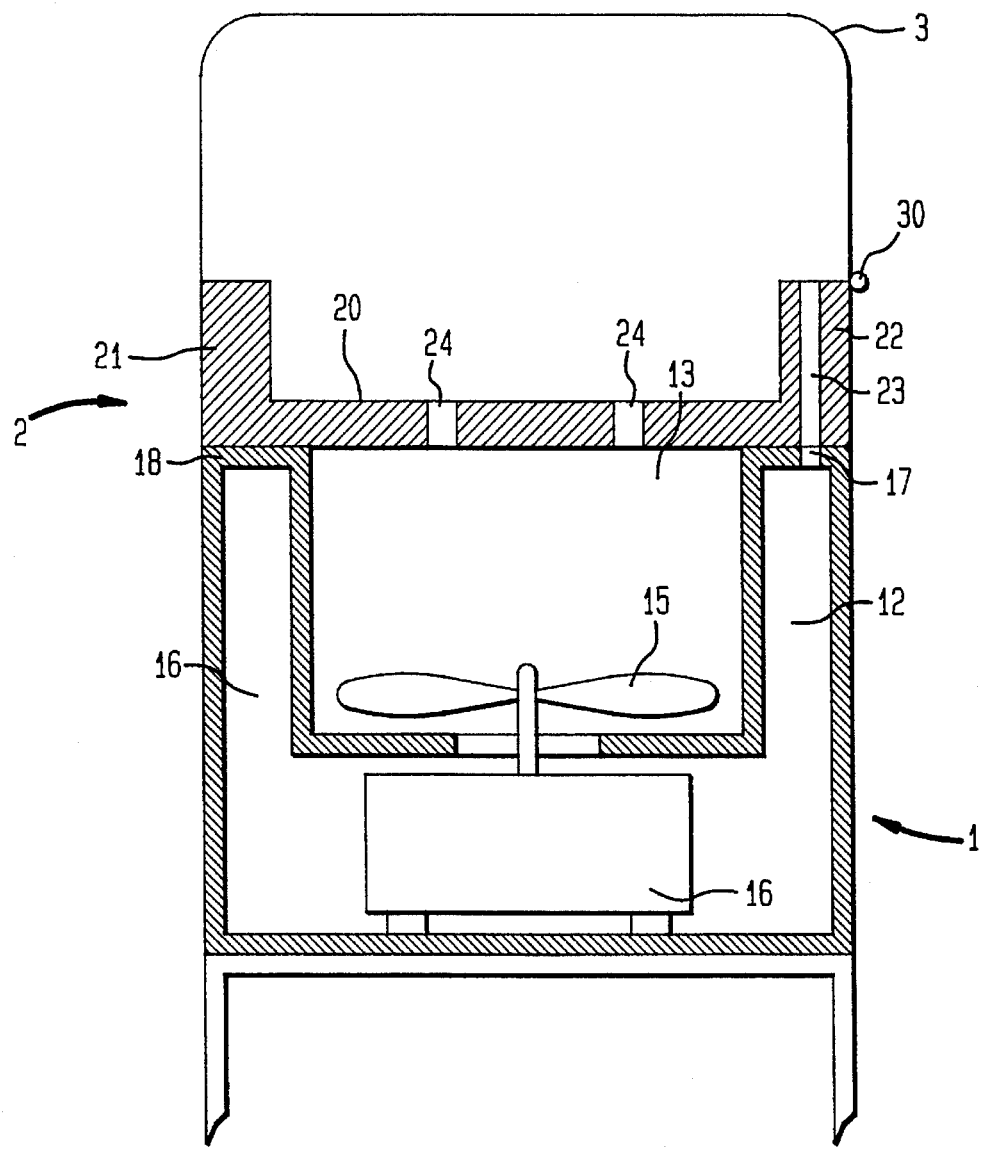
FIG. 3 shows a transverse cross-sectional view of a second method of constructing a transfer module according to the invention.

It is shown in FIG. 3 that the chamber 1 comprises a U-shaped profile. The main compartment 13 is delimited by the profile and the tray 2. The fan 16 is placed in the secondary compartment 12 having its blade positioned in the main compartment 13.

Figure 4:
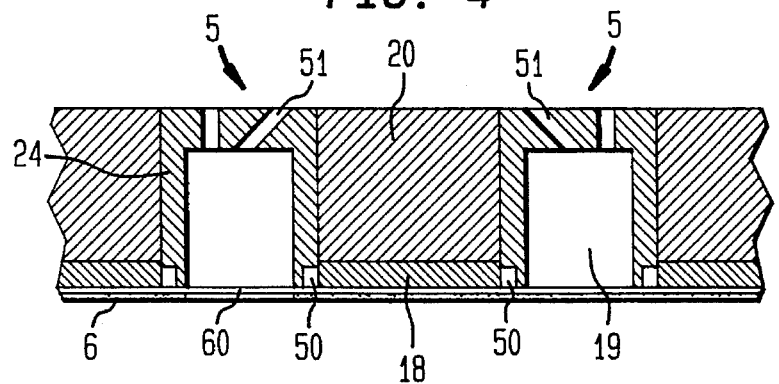
FIG. 4 shows a partial longitudinal cross-sectional view of a device according to the invention, which enables transfers in two opposite directions.

FIG. 4 illustrates that the device of the invention makes it possible to create, alternately, two opposite directions of transfer.

Into orifices 24 and 19, respectively, in the bottom 20 of the tray 2 and in the upper wall 18 of the chamber 1, alternately, stoppers 5 are inserted. Such stoppers are provided in the circumference of their base with rings 50 made of a magnetic material.

An iron foil 6 having openings 60 slides against the wall 18 of the chamber 1. In keeping longitudinal movement assured, for example, by a jack placed at the end of the module, with either the stoppers 5 having orifices 51 oriented in one direction, or the stoppers 5 with orifices 51 oriented in the other direction, the rings 50 flattens, by magnetic effect, the foil 6 against the orifices 19 of the wall 18 of the chamber 1. The orifices 19 are not opposite the orifices 60.

Thus, to invert the direction of motion, it is sufficient to stop the fan, wait until the objects are stationary and then transfer the foil 6 and restart the fan 16.

This method can also be used with stoppers 5 whose oblique orifices 51 are all oriented in the same direction but are alternately of different diameters. The purpose of moving the foil 6 is then to vary the power of the directed air flow.

It is also possible to make a variable-direction transfer device using stoppers each having, in addition to the magnetic ring, a vertical internal partition separating it into two compartments. The upper wall of the partition are pierced with orifices of inverse obliqueness depending on the compartment into which they are aimed. The used foil is then pierced alternately with orifices. This enables the invention to keep its longitudinal movement and to be placed opposite one or the other of the compartments of the stoppers.

Figure 5:
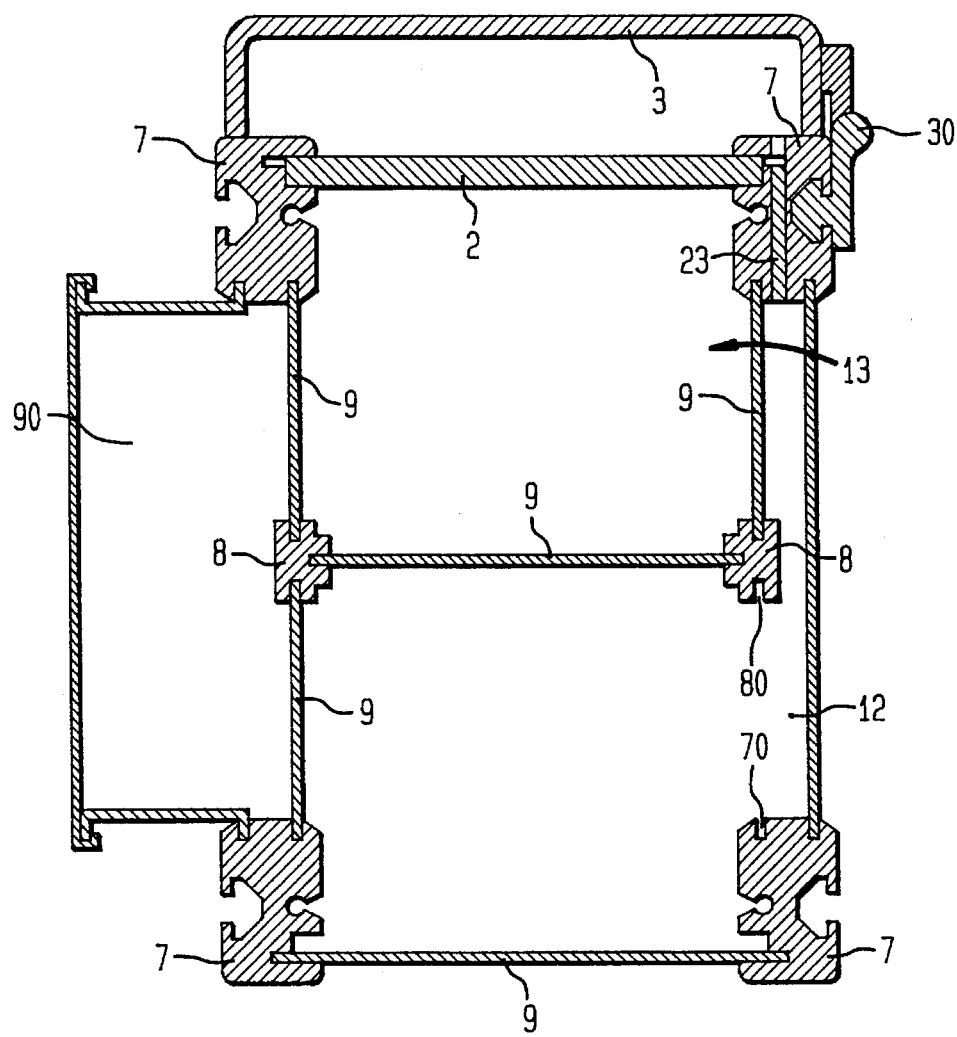
FIG. 5 shows a transverse cross-sectional view of a chamber according to the invention, constructed by assembly of plates or profiles.

FIG. 5 shows that the chamber 1 can be made, not of a block by extrusion, but by forced assembly of profiles 7 and 8 with plates 9 and the tray 2, to create the compartments 12 and 13.

Figure 6:
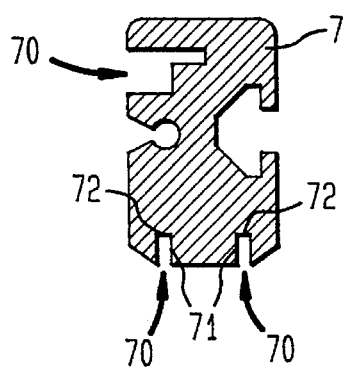
FIG. 6 shows a transverse cross-sectional view, on a larger scale, of one of the profiles in FIG. 5.
Figure 7:
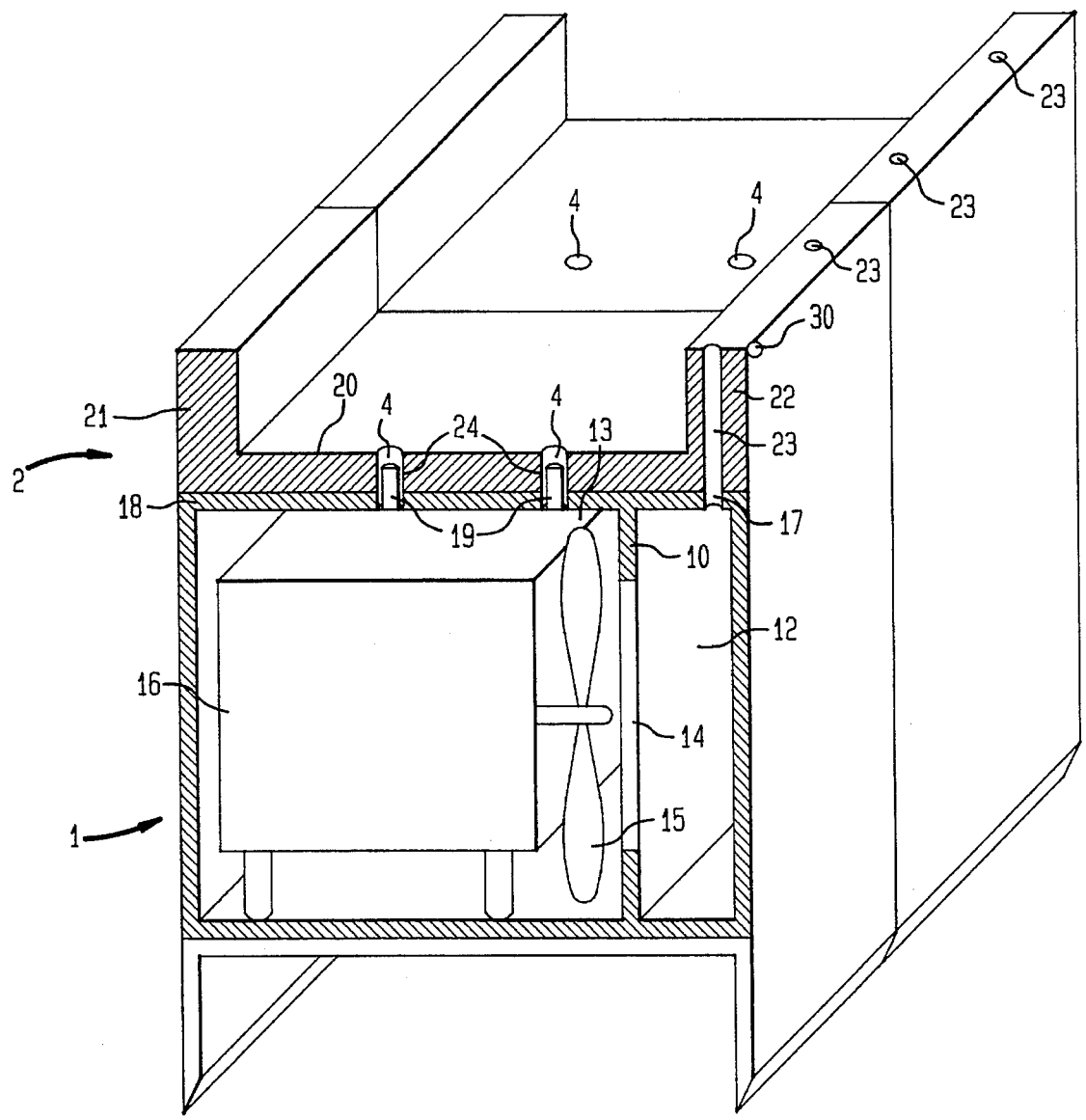
FIG. 7 illustrates a schematic semi-perspective view of the device of the present invention having two modules shown without covers.

The profiles 7, shown in FIG. 6, and the profiles 8, are made by extrusion, and have longitudinal grooves 70, 80, arranged in different planes. One side wall is formed with the oblique longitudinal scores 71 directed toward the bottom 72 of the groove.

This process enables easy construction, using the same profiles 7 and 8, depending on the choice of plates 9, of chambers of different shapes and sizes, further enabling construction of an additional compartment 90 for passage of electrical cables.

The present invention is not limited to the preceding embodiments of some of its methods of construction, which may undergo modifications without thereby departing from the scope of the invention.

I claim:

1. A device for air-flow transfer of objects each having at least one substantially flat surface, said device comprising
   a plurality of modules, each said module consisting of a chamber receiving a tray assembly, said tray assembly having a bottom part with at least two longitudinal edges extending outwardly therefrom, said chamber being formed with at least first and second compartments separated by a wall having an opening, at least two orifices passing through one of said longitudinal edges into said second compartment, at least two channels penetrating through said bottom part into said first compartment, each said channels having a stopping member with at least one passage going therethrough; and
   a fan having a blade, said fan being housed in at least one said chamber so that said blade faces said opening in said wall thereof.

2. The device of claim 1, wherein said fan and said blade are positioned within said first compartment of said one chamber.

3. The device of claim 1, wherein said fan is situated in the second compartment of said one chamber and said blade is positioned in said first compartment of said one chamber.

4. The device of claim 1, wherein each said tray assembly is covered by a cover.

5. The device of claim 1, wherein each said chamber further comprises a top wall, said at least two channels penetrating through said top wall, each said stopping member having a base in a vicinity of said top wall, a magnetic member being positioned at each said base substantially flush with said top wall, and a metal foil sliding against said top wall, said metal foil having a plurality of orifices which open and close said channels during longitudinal motion of said foil.

6. The device of claim 1, wherein each said chamber is formed by a plurality of guiding members, each said guiding member having at least one longitudinal groove receiving a substantially flat plate.

7. The device of claim 6, wherein each said groove is formed by two lateral walls connected by an intermediate wall, at least one said lateral wall having a multiplicity of engaging members oriented towards said intermediate wall, and upon insertion of each said plate into a respective said groove said engaging members facilitate engagement between said plate and a respective said guiding member.

8. A device for air-flow transfer of objects each having at least one substantially flat surface, said device comprising
   a plurality of modules, each said module consisting of a chamber receiving a tray assembly, said tray assembly having a bottom part, said chamber being formed with at least first and second compartments separated by a wall having an opening, at least two orifices penetrating through said bottom part into said second compartment, at least two channels penetrating through said bottom part into said first compartment, each said channel having a stopping member with at least one passage going therethrough; and
   a fan having a blade, said fan being housed in at least one said chamber so that said blade faces said opening in said wall thereof.

9. The device of claim 8, wherein said fan and said blade are positioned within said first compartment of said one chamber.

10. The device of claim 8, wherein said fan is situated in the second compartment of said one chamber and said blade is positioned in said first compartment of said one chamber.

11. The device of claim 8, wherein each said tray assembly is covered by a cover.

12. The device of claim 8, wherein each said chamber further comprises a top wall, said at least two channels penetrating through said top wall, each said stopping member having a base in a vicinity of said top wall, a magnetic member being positioned at each said base substantially flush with said top wall, and a metal foil sliding against said top wall, said metal foil having a plurality of orifices which open and close said channels during longitudinal motion of said foil.

13. The device of claim 8, wherein each said chamber is formed by a plurality of guiding members, each said guiding member having at least one longitudinal groove receiving a substantially flat plate.

14. The device of claim 13, wherein each said groove is formed by two lateral walls connected by an intermediate wall, at least one said lateral wall having a multiplicity of engaging members oriented towards said intermediate wall, and upon insertion of each said plate into a respective said groove said engaging members facilitate engagement between said plate and a respective said guiding member.

* * * * *